Dec. 1, 1925.

R. S. HOAR

WINCH CONTROL MECHANISM

Filed June 6, 1923

INVENTOR.
ROGER SHERMAN HOAR
BY
ATTORNEY.

Dec. 1, 1925.
R. S. HOAR
1,563,568
WINCH CONTROL MECHANISM
Filed June 6, 1923      2 Sheets-Sheet 2
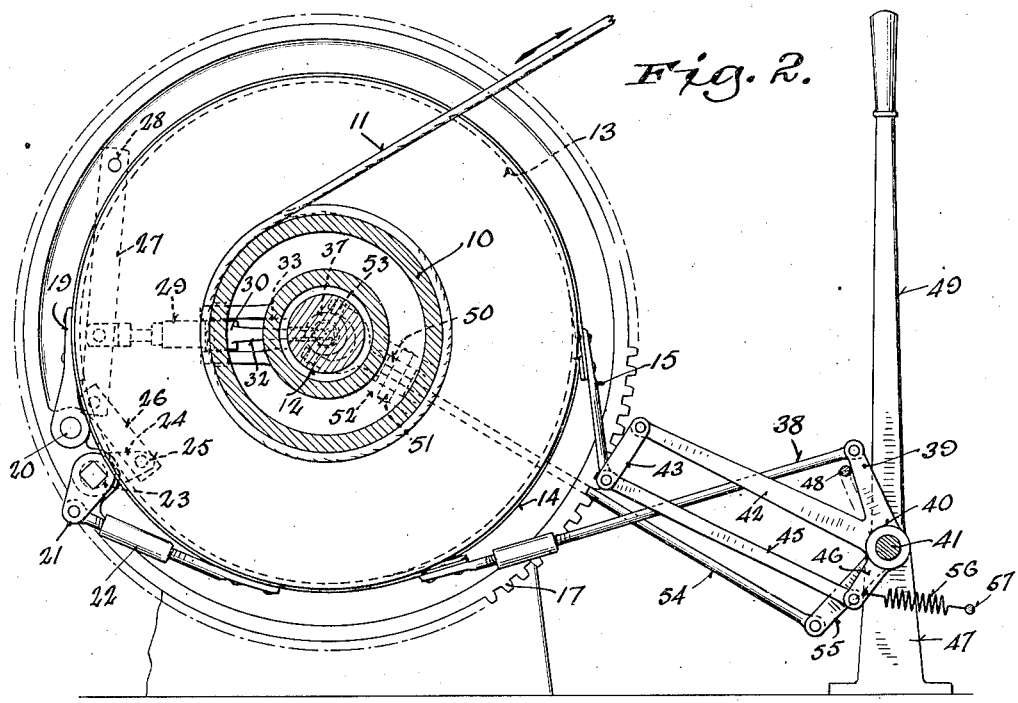
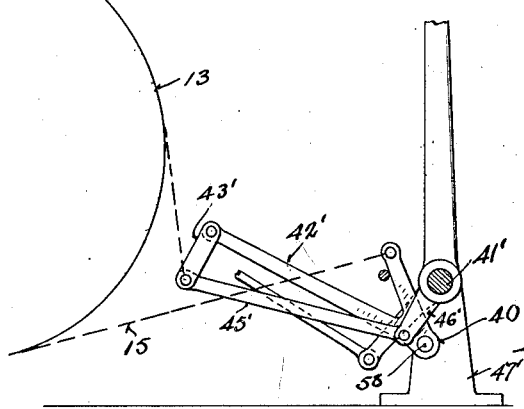
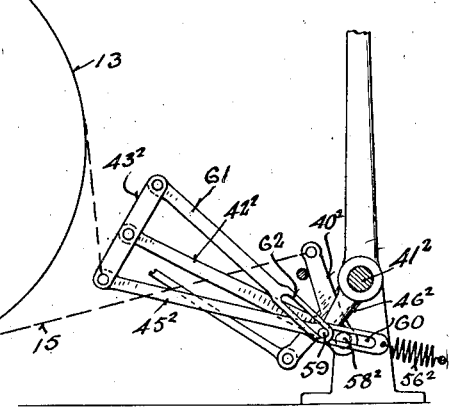
INVENTOR.
ROGER SHERMAN HOAR
BY Ralph W. Brown
ATTORNEY.

Patented Dec. 1, 1925.

1,563,568

UNITED STATES PATENT OFFICE.

ROGER SHERMAN HOAR, OF SOUTH MILWAUKEE, WISCONSIN, ASSIGNOR TO BUCYRUS COMPANY, OF SOUTH MILWAUKEE, WISCONSIN, A CORPORATION OF WISCONSIN.

WINCH CONTROL MECHANISM.

Application filed June 6, 1923. Serial No. 643,840.

*To all whom it may concern:*

Be it known that I, ROGER SHERMAN HOAR, a citizen of the United States, residing at South Milwaukee, in the county of Milwaukee and State of Wisconsin, have invented a certain new and useful Improvement in Winch-Control Mechanism, of which the following is a full, clear, concise, and exact description, reference being had to the accompanying drawings, forming a part of this specification.

This invention relates to winch control mechanisms.

Although useful in other relations this invention may be employed to particular advantage in the control of power excavators, cranes and the like.

Machines of this character are ordinarily equipped with a multitude of levers. For instance, the hoisting drum ordinarily requires at least two levers, one for the clutch and the other for the brake thereof. Similarly, two more levers are ordinarily required for each of the other operating drums, such as the dragline drum, the thrusting drum, or the like. In fact, there are sometimes as many as seven or eight independent levers, all under the control of one operator. Their manipulation and care during operation necessitates rapid shifting by the operator from lever to lever, and can be accomplished only by the exercise of constant effort and keen alertness on his part. He is thus subjected to great fatigue. Any modification of the control mechanism which will permit a reduction in the required number of levers, without sacrificing fineness of control, will obviously be a great boon to the operator.

One object of the present invention is the provision of a single-lever control for a drum which will satisfactorily fulfill the operating requirements of power excavators, cranes and the like, where a delicate control is essential.

Heretofore this has never been feasible. Prior attempts to place both the clutch and brake elements of a drum under the control of one lever have not met with practical success. This was due, at least in part, to the inability to avoid a neutral intermediate position of the lever in which position control of the drum was lost. As heretofore arranged, the brake was applied and the clutch opened in one extreme position of the lever and in the other extreme position the brake was released and the clutch closed. In shifting from one position to the other the lever necessarily passed through the neutral position mentioned, thus permitting some dropping of the drum supported load, regardless of how rapidly the shift was made. This loss of control, even though momentary, is sufficient to render these prior devices inapplicable to power shovels and the like, where absolute control at all times is essential.

Another object of the present invention is the provision of a single-lever control in which the lever is movable between the brake applied and clutch closed position without necessarily passing through the neutral position mentioned.

Another object is the provision of a single-lever control for winches, such that in one extreme position of the lever the winch is operable to raise the load, in an intermediate position the winch is operable to hold the load, and in the other extreme position the winch is operable to lower the load.

Another object is the provision of a brake which when applied is operable to prevent rotation in one direction only and which may be gradually released to permit rotation in such direction at any desired speed.

Another object is the provision of a unitary control mechanism of the type mentioned for the clutch and brake element of a winch, such that the brake may be automatically and fully released whenever the clutch is closed.

Other objects and advantages will appear from the following description of three illustrative embodiments of the present invention.

In the drawings:

Figure 2 is a side elevation of the mechanism shown in Figure 1.

Figure 3 is a side elevation of a brake mechanism of somewhat different form which might be used in place of that shown in Figures 1 and 2.

Figure 4 is a side elevation of another form of brake mechanism embodying novel features of the present invention.

Figure 1:
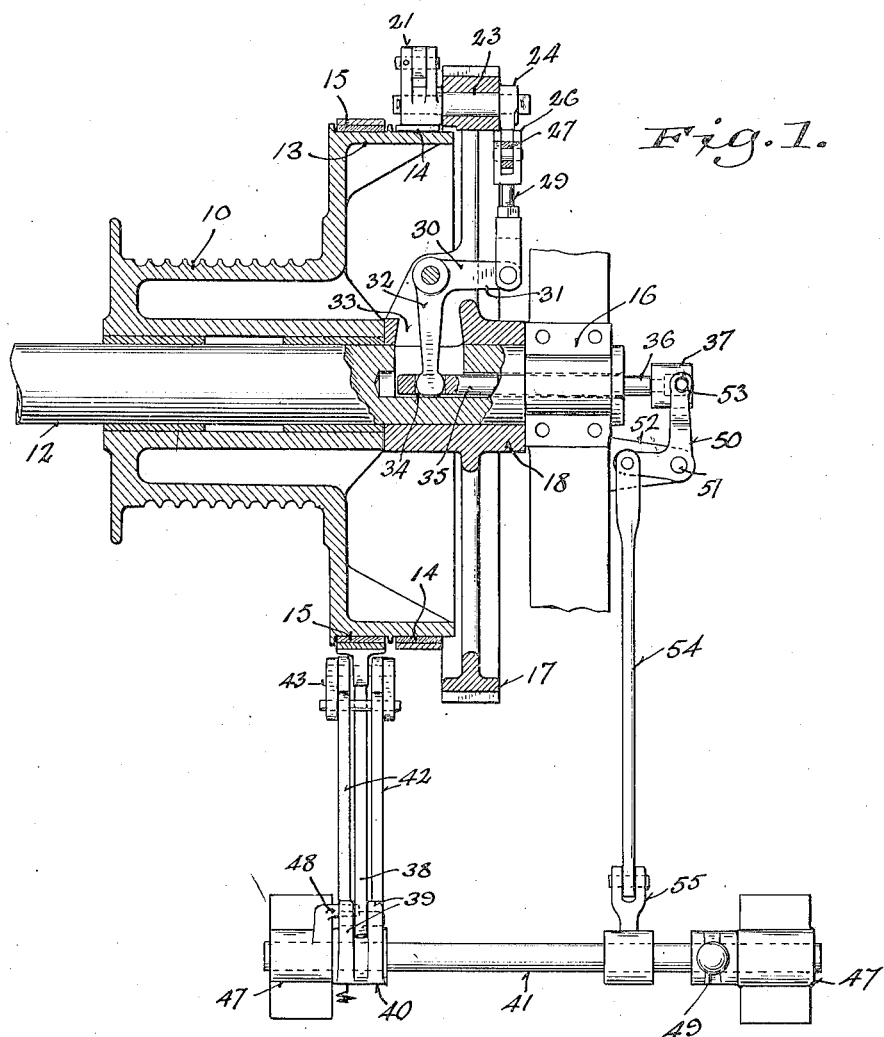
Figure 1 is a plan view of a winch control mechanism constructed in accordance with the present invention and shown applied to a winch of conventional form.

The winch shown comprises a drum 10 adapted to receive and control the hoisting cable 11, the tension in which tends to rotate the drum in a clockwise direction, as indicated by the arrows in Figure 2. This drum is journaled on a shaft 12 and is provided at one end with the usual flange 13 for cooperation with the clutch and brake bands 14 and 15, respectively. The shaft 12 is journaled in fixed bearings, one of which is indicated by the numeral 16.

The clutch band 14 is carried by a driver 17 which, in this instance, is in the form of a gear wheel having a hub 18 keyed or otherwise fixed to the shaft 12. One end 19 of the clutch band is anchored upon a pin 20 fixed in the wheel, while the other end is connected to one arm 21 of a bell crank through an adjustable connection 22. The bell crank is pivotally mounted at a fixed point 23 in the wheel, its other arm 24 being connected to one end 25 of a pair of toggle levers 26 and 27. Lever 27 is pivotally secured at a fixed point 28 in the wheel and is actuated and controlled by a link 29 connected thereto and extending substantially radially of the wheel. A bell crank 30 carried by the wheel so as to rock in a radial plane thereof is provided with an arm 31 to which link 29 is connected. The other arm 32 extends downwardly through a slot 33 in the hub 18 and projects into a slot 34 formed within one end of an actuating pin 35. Pin 35 is mounted for longitudinal reciprocation within and axially of the shaft 12, and at its other end 36, which projects beyond the shaft 12, is fashioned to rotatably receive a control collar 37.

Since the mechanism thus far disclosed is old and well known in the art, further or more detailed description of the construction thereof is deemed unnecessary. Suffice it to say that when the pin 35, which rotates with the wheel 17 and shaft 12, is shifted to the left (Fig. 1), the link 29 is drawn downwardly by the bell crank 30 and the toggle levers 26 and 27 are actuated to rock the bell crank arm 21 in such direction as to tension the clutch band 14 against the face of the flange 13 of the drum 10. When the clutch is thus closed the drum 10 is caused to rotate with the driving wheel 17 in a counter-clockwise direction (Fig. 2). To release the clutch the pin 35 is shifted toward the right (Fig. 1).

The brake mechanism is such as to retain the drum under the influence thereof until actual closure of the clutch mechanism. Absolute control of the drum is thus assured in all conditions of operation. Although this might be accomplished in various ways, a differential brake is preferably employed which, when applied, will prevent rotation of the drum under the influence of the load but will automatically permit rotation in the opposite direction under the influence of the driver; and which, when released, will permit controlled rotation under the influence of the load. One example of a differential brake mechanism having these characteristics is shown in Figures 1 and 2.

The brake band 15 therein shown is connected at one end 38 with the short arm 39 of a bell crank 40 mounted upon a rock shaft 41 to rock with respect thereto. The long arm 42 of this bell crank carries a short depending link 43 pivotally connected therewith. The other end 44 of the brake band is connected to the lower end of link 43. This link is rockable toward and from the drum flange 13 by a link 45 connected therewith and with a crank arm 46 fixed to the rock shaft 41. Shaft 41 is journaled in fixed bearing brackets 47. The bell crank 40 normally assumes the position shown resting against the stop-pin 48, carried by the adjacent bracket 47. In this position, the end 38 of the brake-band 15 is dead-ended just exactly as in the case of an ordinary band brake, and the tension in the brake band can be applied or released by motion of the rock shaft 41, with the same nicety of control as in the case of an ordinary band brake. In the device shown, there is also a tension spring 56 joining the crank arm 46 to a fixed stop 57. This spring serves to apply sufficient tension, which otherwise would be supplied by hand power, to set the brake fully; the easing off of the brake being accomplished by rotating the rock shaft 41 in opposition to the spring. The foregoing describes the effect as the drum tends to rotate in a clockwise direction under the influence of the load.

When, however, the clutch is applied and the drum starts to rotate in a counter-clockwise direction, under the influence of the driving means, the tension in the brake band rocks the bell crank 40 in a clockwise direction, thereby automatically releasing the brake. Thus the brake operates as an ordinary band brake under influence of the load, and as a differential brake under the influence of the driving means. If the driving means be released, and the rock-shaft 41 be still set, the bell crank 40 will immediately return to its initial position, due to its own weight, and the brake will instantly automatcally set, thus preventing any lowering of the load until the brake is again eased off by hand.

The rock shaft 41 is controlled by any appropriate means, such as a hand lever 49 secured thereto. In order to provide a unitary control for both the brake and clutch mechanisms the rock shaft 41 is operatively connected with the pin 35 of the clutch mechanism. In this instance, a bell crank 50 is rockably mounted, as at 51, within an appropriate bracket 52 fixed to the bearing bracket 16. One arm of the bell crank has a swiveled connection 53 with the collar 37 on the pin 35, while the other arm is connected through a link 54 with a crank arm 55 fixed to the rock shaft 41. The arrangement is such that in the normal position of the lever 49 (the position shown) and in the brake releasing position the clutch remains open. By rocking the lever in a counter-clockwise direction from that shown, however, the pin 35 is shifted to the left and the clutch is closed in the manner above described. During this movement of the lever and rock shaft, links 43 and 44 are, of course, shifted slightly away from the drum, but the bell crank 40 rocks upwardly sufficiently to compensate for this otherwise tensioning of the brake band and assumes a position such as to permit rotation of the drum in a counter-clockwise direction and to prevent rotation in the other direction. This condition of the brake mechanism exists during the clutch closing movement so that there is no intermediate position in which control of the drum may be lost.

A differential brake mechanism of a slightly different form is shown in Figure 3. In this form the bell crank 40' is mounted to rock about a fixed pivot 58 within the bracket 47' below the control shaft 41'. By this arrangement, a more effective release of the brake band results from the upward tilting of the bell crank.

In the differential brake mechanism shown in Figure 4 the bell crank $40^2$ is mounted to rock about a fixed pivot $58^2$ below the control shaft $41^2$, as in the mechanism shown in Figure 3. In this instance, however, the crank arm $46^2$ is provided with a pin 59 which engages within a slot 60 in the link $45^2$. The link $43^2$ pivotally connected with the long arm $42^2$ of the bell crank extends upwardly above this crank arm and is connected at its upper end with one end of a link 61. The other end 62 of this link is slotted to receive the pin 59. A spring $56^2$ acting on link $45^2$ serves a function similar to that of the spring 56 shown in Figure 2. The arrangement is such that when the lever 49 and control shaft are rocked in a clockwise direction, the pin 59, acting against the slot 60 in link $45^2$, shifts the link toward the drum to release the brake in the manner above described. In moving the lever 49 in the other direction to close the clutch, the pin 59 acts against the slot 62 in link 61 to shift the link to the right and thus, through the link $43^2$, tends to again release the brake in the same manner as motion in the other direction. Friction between the brake band and drum is thus reduced during rotation of the drum under the action of the driver and clutch mechanism.

Various changes may be made in any of the embodiments of the invention above specifically described, without departing from or sacrificing any of the advantages of the invention as defined in the appended claims.

I claim:

1. The combination of a rotatable member means normally operable to permit rotation of said member in one direction and to prevent rotation in the other direction, means under the control of the operator for rotating said member in the direction first named, and means for gradually releasing said first named means to permit rotation of said member in said other direction at controlled speeds.

2. The combination of a rotatable member, means normally operable to permit rotation of said member in one direction and to prevent rotation in the other direction, driving means for said member, and control mechanism selectively operable to render said driving means active on said member to rotate the same in the direction first named or to gradually release said first named means to permit controlled rotation of said member in said other direction.

3. The combination of a driven member under load, driving means therefor, means normally operable to permit operation of said member by said driving means and to prevent operation of said member by said load, and control mechanism selectively operable to render said driving means active on said member to move the load or to gradually release said last named means so as to permit said member to operate at controlled speed under the influence of the load.

4. In a winch the combination of a drum, a brake associated therewith normally operable to permit rotation thereof in one direction only, means including a clutch operable to drive said drum in such direction, and means for gradually releasing said brake to permit controlled rotation of said drum in another direction when said driving means is inactive thereon.

5. In a winch the combination of a drum, a brake associated therewith normally operable to permit rotation thereof in one direction only, driving means, clutch mechanism between said drum and driving means, and control mechanism selectively operable to close said clutch to rotate said drum in the direction named or to gradually release said brake to permit rotation of said drum at controlled speeds in the other direction.

6. In a winch the combination of a drum, a control lever, means operable when said lever is in one position to rotate said drum in one direction, and means permitting rotation of said drum in the other direction at controlled speeds when said lever is in any of a range of positions but automatically operable to hold said drum against rotation during movement of said lever between said first named position and range of positions.

7. In a winch the combination of a drum, driving means therefor, a control lever, a clutch controlled by said lever for connecting said driving means with said drum when said lever is moved into one position, a brake for said drum, and means controlled by said lever for gradually releasing said brake when said lever is moved into another position and for applying said brake to hold said drum against rotation during movement of said lever between said positions.

8. In a winch the combination of a drum, a control lever, a clutch controlled thereby and operable when said lever is in one extreme position to rotate said drum in one direction, a brake controlled by said lever for holding said drum against rotation when said lever is in an intermediate position, and means for gradually releasing said brake to permit rotation of said drum in the other direction by movement of said lever toward the other extreme position.

9. In combination, a rotatable member, a control lever, a brake, means normally responsive to the direction of rotation of said member for automatically applying and releasing said brake, and means responsive to movement of said lever for gradually releasing said brake to permit controlled rotation of said member.

10. The combination with a drum of a brake normally operable to permit rotation of said drum in one direction only, and means for gradually releasing said brake to permit and control rotation of said drum in the other direction at any desired speed.

11. The combination with a drum of a brake band associated therewith, means for automatically applying a braking tension to said band when said drum tends to rotate in one direction and for automatically releasing such tension when said drum tends to rotate in the other direction, and means for reducing the tension in said band to any desired degree during rotation of said drum in the direction first named.

12. The combination with a drum of a brake band associated therewith, means for automatically applying a braking tension to said band when said drum tends to rotate in one direction and for automatically releasing such tension when said drum tends to rotate in another direction, and means for dead-ending one end of said band and simultaneously effecting any desired degree of tension in the other end thereof during rotation of the drum in the direction first named.

13. A brake having a brake band, a fixed pivot, a bell-crank thereon having a long arm and a short arm, said short arm being connected to one end of said band, a link pivotally connected to said long arm and to the other end of said band, a stop for limiting the rocking movement of said bell-crank in one direction, and means for adjusting said link.

14. A brake having a brake band, a fixed pivot, a bell-crank thereon having a long arm and a short arm, said short arm being connected to one end of said band, a link connected to said long arm and to the other end of said band, a stop for limiting the movement of said bell-crank, means for yieldably retaining said elements in brake-applying position, and means for adjusting said link to release the brake.

15. A brake having a brake band, control means, mechanism operable to apply a braking tension in said band when said means is in one position and to release the tension in said band when said means is moved in either direction from said position.

16. In combination, a control lever, a differential brake operating normally when said lever is in intermediate position, and means responsive to movement of said lever in either direction from said position for releasing said brake.

17. In combination, a rotatable member, a control lever, a brake normally operable when said lever is in one position to prevent rotation of said member in one direction, and means responsive to movement of said lever in either direction from said position for releasing said brake.

18. In combination, a rotatable member, a control lever, a brake, means responsive to the direction of rotation of said member when said lever is in one position for automatically applying and releasing said brake, and means responsive to movement of said lever in either direction from said position for releasing said brake.

19. A brake having a brake band, a fixed pivot, a bell-crank thereon having a long arm and a short arm, said short arm being connected to one end of said band, a link connected to said long arm and to the other end of said band, a stop for limiting the movement of said bell-crank, means for yieldably retaining said elements in brake-applying position, and means for adjusting said link to release the brake, said last named means consisting in a control lever pivoted adjacent the pivot of said bell-crank and in a linkage operatively connecting said lever to said link.

20. In combination, a control lever, a differential brake operating normally when said lever is in intermediate position, and means responsive to movement of said lever in either direction from said position for gradually releasing said brake.

21. In combination, a rotatable member, a control lever, a brake normally operable when said lever is in one position to prevent rotation of said member in one direction, and means responsive to movement of said lever in either direction from said position for gradually releasing said brake.

In witness whereof, I hereunto subscribe my name this 29th day of May, 1923.

ROGER SHERMAN HOAR.